(12) United States Patent
Flohr et al.

(10) Patent No.: US 8,568,883 B2
(45) Date of Patent: Oct. 29, 2013

(54) SUPERABSORBENT POLYMER PARTICLES WITH IMPROVED SURFACE CROSS-LINKING AND IMPROVED HYDROPHILICITY AND METHOD OF MAKING THEM USING VACUUM UV RADIATION

(75) Inventors: Andreas Flohr, Kronberg (DE); Torsten Lindner, Kronberg (DE)

(73) Assignee: Then Procter & Gamble Company, Cincinnati, OH (US)

( * ) Notice: Subject to any disclaimer, the term of this patent is extended or adjusted under 35 U.S.C. 154(b) by 1220 days.

(21) Appl. No.: 11/298,416

(22) Filed: Dec. 8, 2005

(65) Prior Publication Data

US 2006/0128902 A1    Jun. 15, 2006

(30) Foreign Application Priority Data

Dec. 10, 2004  (EP) .................................. 04029321

(51) Int. Cl.
*C08F 6/00*   (2006.01)
*C08J 3/28*   (2006.01)

(52) U.S. Cl.
USPC ........................... 428/407; 522/114; 522/153

(58) Field of Classification Search
USPC .................. 428/520, 521, 522, 36.3
See application file for complete search history.

(56) References Cited

U.S. PATENT DOCUMENTS

| | | |
|---|---|---|
| 3,214,492 A | 10/1965 | Tocker |
| 3,429,852 A | 2/1969 | Martin |
| 3,622,848 A | 11/1971 | Hendrix et al. |
| 3,661,875 A | 5/1972 | Sieja |
| 3,860,003 A | 1/1975 | Buell |
| 3,935,099 A | 1/1976 | Weaver et al. |
| 3,959,569 A | 5/1976 | Burkholder, Jr. et al. |
| 4,043,887 A | 8/1977 | Pacifici et al. |
| 4,062,817 A | 12/1977 | Westerman |
| 4,076,663 A | 2/1978 | Masuda et al. |
| 4,093,776 A | 6/1978 | Aoki et al. |
| 4,124,748 A | 11/1978 | Fujimoto et al. |
| 4,286,082 A | 8/1981 | Tsubakimoto et al. |
| 4,304,895 A | 12/1981 | Loshaek |
| 4,367,323 A | 1/1983 | Kitamura et al. |
| 4,389,513 A | 6/1983 | Miyazaki |
| 4,446,261 A | 5/1984 | Yamasaki et al. |
| 4,514,345 A | 4/1985 | Johnson et al. |
| 4,610,678 A | 9/1986 | Weisman et al. |
| 4,625,001 A | 11/1986 | Tsubakimoto et al. |
| 4,654,039 A | 3/1987 | Brandt et al. |
| 4,666,983 A | 5/1987 | Tsubakimoto et al. |
| 4,683,274 A | 7/1987 | Nakamura et al. |
| 4,690,996 A | 9/1987 | Shih et al. |
| 4,721,647 A | 1/1988 | Nakanishi et al. |
| 4,734,478 A | 3/1988 | Tsubakimoto et al. |
| 4,738,867 A | 4/1988 | Itoh et al. |
| 4,748,076 A | 5/1988 | Saotome |
| 4,769,427 A | 9/1988 | Nowakowsky et al. |
| 4,783,510 A | 11/1988 | Saotome |
| 4,834,735 A | 5/1989 | Alemany et al. |
| 4,847,137 A | 7/1989 | Kellen et al. |
| 4,873,299 A | 10/1989 | Nowakowsky et al. |
| 4,910,250 A | 3/1990 | Saotome |
| 4,922,004 A | 5/1990 | Kohler et al. |
| 4,940,464 A | 7/1990 | Van Gompel et al. |
| 4,950,683 A | 8/1990 | Ward et al. |
| 4,950,692 A | 8/1990 | Lewis et al. |
| 4,973,632 A | 11/1990 | Nagasuna et al. |
| 4,985,518 A | 1/1991 | Alexander et al. |
| 5,124,416 A | 6/1992 | Haruna et al. |
| 5,128,386 A | 7/1992 | Rehmer et al. |
| 5,137,537 A * | 8/1992 | Herron et al. ...................... 8/120 |
| 5,145,906 A | 9/1992 | Chambers et al. |
| 5,147,345 A | 9/1992 | Young et al. |
| 5,151,092 A | 9/1992 | Buell et al. |
| 5,164,459 A | 11/1992 | Kimura et al. |
| 5,223,645 A | 6/1993 | Barwich et al. |
| 5,244,735 A | 9/1993 | Kimura et al. |
| 5,244,934 A * | 9/1993 | Umeda et al. .................. 522/129 |
| 5,248,805 A | 9/1993 | Boettcher et al. |

(Continued)

FOREIGN PATENT DOCUMENTS

| | | |
|---|---|---|
| DE | 19 619 680 A | 11/1997 |
| DE | 10 221 202 A | 7/2003 |
| EP | 0248437 A2 | 12/1987 |
| EP | 0 279 475 A2 | 8/1988 |
| EP | 0 287 970 B1 | 10/1988 |
| EP | 0287970 A  * | 10/1988 |
| EP | 0 246 848 A | 11/1988 |
| EP | 0 377 191 A2 | 7/1990 |
| EP | 0 514 775 A1 | 11/1992 |
| EP | 0 700 673 A1 | 3/1996 |
| EP | 0 509 708 B1 | 12/1997 |
| EP | 0 811 636 B1 | 8/2001 |
| EP | 1 178 059 A2 | 2/2002 |
| EP | 0 456 136 B1 | 3/2002 |

(Continued)

OTHER PUBLICATIONS

Y. Tang, R.P. Thorn, R.L. Mauldin III, P.H. Wine, Kinetics and Spectroscopy of the $SO_4$-Radical in Aqueous Solution, Journal of Photochemistry and Photobiology, A: Chemistry, 44(1988), pp. 243-258, Elsevier Sequoia/Printed in The Netherlands.

(Continued)

*Primary Examiner* — Ramsey Zacharia
(74) *Attorney, Agent, or Firm* — Abbey A. Lopez; Richard L. Alexander; Eric T. Addington

(57) ABSTRACT

The present invention relates to superabsorbent polymer particles with improved surface cross-linking and improved hydrophilicity and their use in absorbent articles.
Superabsorbent polymer particles of the invention consist of cross-linked poly(meth)acrylic acid and salts thereof. The polymer chains comprised by the superabsorbent polymer particles are cross-linked to each other through direct covalent bonds and comprise alcoholic hydroxyl groups.
Moreover, the invention relates to a method for surface cross-linking superabsorbent polymer particles using vacuum UV irradiation.

8 Claims, No Drawings

(56) References Cited

U.S. PATENT DOCUMENTS

| | | | |
|---|---|---|---|
| 5,250,640 A | 10/1993 | Irie et al. |
| 5,260,345 A | 11/1993 | Desmarais et al. |
| 5,264,495 A | 11/1993 | Irie et al. |
| 5,264,533 A | 11/1993 | Rehmer et al. |
| 5,275,773 A | 1/1994 | Irie et al. |
| 5,342,338 A | 8/1994 | Roe |
| 5,380,808 A | 1/1995 | Sumiya et al. |
| 5,387,207 A | 2/1995 | Dyer et al. |
| 5,389,699 A | 2/1995 | Rehmer et al. |
| 5,397,316 A | 3/1995 | Lavon et al. |
| 5,422,405 A | 6/1995 | Dairoku et al. |
| 5,478,879 A | 12/1995 | Kajikawa et al. |
| 5,554,145 A | 9/1996 | Roe et al. |
| 5,562,646 A | 10/1996 | Goldman et al. |
| 5,569,234 A | 10/1996 | Buell et al. |
| 5,597,873 A | 1/1997 | Chambers et al. |
| 5,610,208 A | 3/1997 | Dairoku et al. |
| 5,625,222 A | 4/1997 | Yoneda et al. |
| 5,633,316 A | 5/1997 | Gartner et al. |
| 5,650,222 A | 7/1997 | DesMarais et al. |
| 5,859,084 A | 1/1999 | Schroder et al. |
| 5,883,158 A | 3/1999 | Nambu et al. |
| 5,922,417 A | 7/1999 | Singleton et al. |
| 5,976,696 A | 11/1999 | Collette et al. |
| 6,004,306 A | 12/1999 | Robles et al. |
| 6,007,833 A | 12/1999 | Chudzik et al. |
| 6,043,311 A | 3/2000 | Houben et al. |
| 6,222,091 B1 | 4/2001 | Beihoffer et al. |
| 6,228,930 B1 | 5/2001 | Dairoku et al. |
| 6,262,141 B1 | 7/2001 | Cywar et al. |
| 6,359,049 B1 | 3/2002 | Carrico et al. |
| 6,376,072 B1 | 4/2002 | Evans et al. |
| 6,455,600 B1 | 9/2002 | Hahnie et al. |
| 6,562,879 B1 | 5/2003 | Hatsuda et al. |
| 6,565,981 B1 | 5/2003 | Messner et al. |
| 6,579,958 B2 | 6/2003 | Wilson |
| 6,803,107 B2 | 10/2004 | Mitchell et al. |
| 6,846,518 B2 | 1/2005 | Katoh et al. |
| 7,166,356 B2 | 1/2007 | Flohr |
| 7,199,211 B2 | 4/2007 | Popp et al. |
| 7,259,212 B2 | 8/2007 | Popp et al. |
| 7,405,321 B2 | 7/2008 | Riegel et al. |
| 7,420,013 B2 | 9/2008 | Riegel et al. |
| 7,799,884 B2 | 9/2010 | Herr et al. |
| 2002/0053754 A1 | 5/2002 | Katoh et al. |
| 2003/0045847 A1 | 3/2003 | Whitmore et al. |
| 2003/0135172 A1 | 7/2003 | Whitmore et al. |
| 2003/0233082 A1 | 12/2003 | Kline et al. |
| 2004/0137250 A1 | 7/2004 | Daniel et al. |
| 2004/0140070 A1 | 7/2004 | Ponomarenko et al. |
| 2004/0143030 A1 | 7/2004 | Ikkai |
| 2004/0155383 A1 | 8/2004 | Jackson et al. |
| 2004/0167486 A1 | 8/2004 | Busam et al. |
| 2005/0003176 A1 | 1/2005 | Katoh et al. |
| 2005/0048221 A1 | 3/2005 | Irie et al. |
| 2005/0142965 A1 | 6/2005 | LaFortune |
| 2005/0203474 A1 | 9/2005 | Flohr |
| 2005/0215752 A1 | 9/2005 | Popp et al. |
| 2005/0234410 A1 | 10/2005 | Ashton et al. |
| 2006/0020078 A1 | 1/2006 | Popp et al. |
| 2006/0052478 A1 | 3/2006 | Madsen et al. |
| 2006/0089611 A1 | 4/2006 | Herfert et al. |
| 2006/0128827 A1 | 6/2006 | Matsumoto et al. |
| 2006/0212011 A1 | 9/2006 | Popp et al. |
| 2006/0235141 A1 | 10/2006 | Riegel et al. |
| 2006/0247377 A1 | 11/2006 | Riegel et al. |
| 2007/0048516 A1 | 3/2007 | Flohr et al. |
| 2007/0048517 A1 | 3/2007 | Flohr et al. |
| 2007/0049689 A1 | 3/2007 | Meyer et al. |
| 2007/0082142 A1 | 4/2007 | Flohr |
| 2007/0167536 A1 | 7/2007 | Iwamura et al. |
| 2007/0238806 A1 | 10/2007 | Mitsukami et al. |

FOREIGN PATENT DOCUMENTS

| | | |
|---|---|---|
| EP | 1199327 A2 | 4/2002 |
| EP | 1 302 485 A1 | 4/2003 |
| EP | 0 955 086 B1 | 9/2003 |
| EP | 0 844 270 B1 | 11/2004 |
| EP | 0 922 717 B1 | 1/2005 |
| EP | 1 504 771 A1 | 2/2005 |
| EP | 1 506 788 A | 2/2005 |
| EP | 1 516 884 A2 | 3/2005 |
| EP | 1 624 002 A1 | 2/2006 |
| EP | 1 757 646 A1 | 2/2007 |
| EP | 1 264 930 | 9/2008 |
| JP | 01-292103 | 11/1989 |
| JP | 2003-073919 | 3/2003 |
| JP | 2003-156961 A | 5/2003 |
| JP | 2003 156961 A | 5/2003 |
| WO | WO 81/03274 A1 | 11/1981 |
| WO | WO 93/16131 A1 | 8/1993 |
| WO | WO 96/07380 | 3/1996 |
| WO | WO 99/55393 A | 11/1999 |
| WO | WO 0189591 A2 | 11/2001 |
| WO | WO 0189592 A2 | 11/2001 |
| WO | WO 02/094328 A | 11/2002 |
| WO | WO 02/100912 | 12/2002 |
| WO | WO 03/043670 A1 | 5/2003 |
| WO | WO 2004/031253 A1 | 4/2004 |
| WO | WO 2004/085496 A | 10/2004 |
| WO | WO 2005/014066 A1 | 2/2005 |
| WO | WO 2005/044915 A1 | 5/2005 |
| WO | WO 2005/082429 A2 | 9/2005 |
| WO | WO 2005/097313 A1 | 10/2005 |
| WO | WO 2006/062253 A1 | 6/2006 |
| WO | WO 2006/062258 A2 | 6/2006 |
| WO | WO 2006/063229 A2 | 6/2006 |

OTHER PUBLICATIONS

Om P. Chawla and Richard W. Fessenden, Electron Spin Resonance and Pulse Radiolysis Studies of Some Reactions of $SO_4$, Radiation Research Laboratories and Department of Chemistry, Mellon Institute of Science, Carnegie-Mellon University, Pittsburgh, Pennsylvania 15213, The Journal of Physical Chemistry, vol. 79, No. 24, 1975.

"IUPAC Compendium of Chemical Terminology, $2^{ND}$ Edition" 1997, http://goldbook.iupac.org/B00744.

International Search Report dated Jun. 16, 2006.

* cited by examiner

SUPERABSORBENT POLYMER PARTICLES WITH IMPROVED SURFACE CROSS-LINKING AND IMPROVED HYDROPHILICITY AND METHOD OF MAKING THEM USING VACUUM UV RADIATION

FIELD OF THE INVENTION

The present invention relates to superabsorbent polymer particles with improved surface cross-linking and their use in absorbent articles. Moreover, the invention relates to a method using vacuum UV radiation for surface cross-linking these superabsorbent polymer particles.

BACKGROUND OF THE INVENTION

Superabsorbent polymers (SAPs) are well known in the art. They are commonly applied in absorbent articles, such as diapers, training pants, adult incontinence products and feminine care products to increase the absorbent capacity of such products while reducing their overall bulk. The SAPs generally are capable of absorbing and retaining amounts of aqueous fluids equivalent to many times their own weight.

Commercial production of SAPs began in Japan in 1978. The early superabsorbent was a cross-linked starch-polyacrylate. Partially neutralized polyacrylic acid eventually replaced earlier superabsorbents in the commercial production of SAPs, and is the primary polymer employed for SAPs today. They generally consist of a partially neutralized lightly cross-linked polymer network, which is hydrophilic and permits swelling of the network once submerged in water or an aqueous solution such as physiological saline. The cross-links between the polymer chains assure that the SAP does not dissolve in water. SAPs are often applied in form of small particles, such as fibers or granules.

After absorption of an aqueous solution, swollen SAP particles become very soft and deform easily. Upon deformation the void spaces between the SAP particles may be blocked, which drastically increases the flow resistance for liquids. This is generally referred to as "gel-blocking". In gel blocking situations liquid can move through the swollen SAP particles only by diffusion, which is much slower than flow in the interstices between the SAP particles.

One commonly applied way to reduce gel-blocking is to make the particles stiffer, which enables the SAP particles to retain their original shape thus creating or maintaining void spaces between the particles. A well-known method to increase stiffness is to cross-link the carboxyl groups exposed on the surface of the SAP particles. This method is commonly referred to as surface cross-linking.

From European Patent Application EP 0 248 437 A2 a water-soluble peroxide radical initiator as surface cross-linking agent is known. An aqueous solution containing the surface cross-linking agent is applied on the surface of the polymer. The surface cross-linking reaction is achieved by heating to a temperature such that the peroxide radical initiator is decomposed while the polymer is not decomposed.

European Patent Application EP 1 199 327 A2 discloses the use of an oxetane compound and/or an imidazolidinone compound for use as surface cross-linking agent. The surface cross-linking reaction is carried out under heat, wherein the temperature is preferably in the range of 60° C. to 250° C. Alternatively, the surface cross-linking reaction in EP 1 199 327 A2 is achieved by a photo-irradiation treatment, preferably using ultraviolet rays.

In general, the surface cross-linking agent is applied on the surface of the SAP particles. Therefore, the reaction preferably takes place on the surface of the SAP particles, which results in improved cross-linking on the surface while not substantially affecting the core of the particles. Hence, the SAP particles become stiffer and gel-blocking is reduced.

A drawback of the commercial surface cross-linking process described above is that it takes a relatively long time, commonly at least about 30 min. However, the more time is required for the surface cross-linking process, the more surface cross-linking agent will penetrate into the SAP particles, resulting in increased cross-linking inside the particles, which has a negative impact on the capacity of the SAP particles. Therefore, it is desirable to have short process times for surface cross-linking. Furthermore, short process times are also desirable with respect to an overall economic SAP particle manufacturing process.

Another drawback of common surface cross-linking processes is that they take place only under relatively high temperatures, often around 150° C. or above. At these temperatures, not only the surface cross-linker reacts with the carboxyl groups of the polymer, but also other reactions are activated, e.g. anhydride-formation of neighboured carboxyl groups within or between the polymer chains, and dimer cleavage of acrylic acid dimers incorporated in the SAP particles. Those side reactions also affect the core, decreasing the capacity of the SAP particles. In addition, exposure to elevated temperatures can lead to colour degradation of the SAP particles. Therefore, these side reactions are generally undesirable.

SAPs known in the art are typically partially neutralized, e.g. with sodium hydroxide. However, in the processes known in the art, neutralization has to be carefully balanced with the need for surface cross-linking: The surface cross-linking agents known in the art only react with free carboxyl groups comprised by the polymer chains but they are not able to react with a neutralized carboxyl groups. Thus, the carboxyl groups can either be applied for surface cross-linking or for neutralization, but the same carboxyl group cannot be applied to fulfil both tasks. Surface cross-linking agents known in the art generally do not react with chemical groups other than carboxyl groups, e.g. they do not react with aliphatic groups.

In the process of making SAP particles, neutralization of free carboxyl groups typically comes first, before surface cross-linking takes place. Indeed, the neutralization step is often carried out in the very beginning of the process, before the monomers are polymerized and cross-linked to form the SAP. Such a process is named 'pre-neutralization process'. Alternatively, the SAP can be neutralized in the middle of polymerization or after polymerization ('post-neutralization'). Furthermore, a combination of these alternatives is also possible.

As the overall number of free carboxyl groups on the outer surface of the SAP particles is limited by the foregoing neutralization, it is very difficult to obtain particles with a high degree of surface cross-linking and hence, a high stiffness to reduce gel-blocking. Furthermore, it is very difficult to obtain SAP particles with evenly distributed surface cross-linking, as the remaining free carboxyl groups are not only few in number but generally also randomly distributed, which sometimes results in SAP particles with regions of rather dense surface cross-linking and regions of sparsely surface cross-linking.

It is therefore an objective of the present invention to provide SAP particles, which have a high degree of surface cross-linking and at the same time allow for a high degree of neutralization.

It is a further objective of the present invention to provide SAP particles with evenly distributed, homogenous surface cross-linking. Moreover, SAP particles should have improved hydrophilicity.

Furthermore, it is an objective of the present invention to provide a method to produce the SAP particles with such properties.

It is a still further objective of the present invention to provide a method for producing SAP particles, wherein the process step of surface cross-linking can be carried out quickly to increase the efficiency of the process.

Moreover, a further objective of the present invention is to provide a process to produce SAP particles, which can be carried out at moderate temperatures in order to reduce undesired side reactions, initiated by elevated temperatures, such as anhydride-formation and dimer cleavage.

SUMMARY OF THE INVENTION

The present invention relates to superabsorbent polymer particles consisting of cross-linked poly(meth)acrylic acid and salts thereof and comprising polymer chains. At least a part of the polymer chains are cross-linked to each other through covalent bonds, which are formed directly between a carbon atom in the backbone of a first polymer chain and a carbon atom in the backbone of a second polymer chain. Furthermore, the superabsorbent polymer particles comprise alcoholic hydroxyl groups covalently bound directly to carbon atoms comprised in the backbone of the polymer chains.

Moreover, the present invention relates to a method of surface cross-linking superabsorbent polymer particles which comprises the steps of a) providing superabsorbent polymer particles comprising polymer chain segments, the polymer chain segments comprising poly(meth)acrylic acid and salts thereof, each superabsorbent polymer particle having a surface and a core, and b) exposing said superabsorbent polymer particles to irradiation with vacuum UV radiation having a wavelength of from 100 nm to 200 nm.

Thereby direct covalent bonds between carbon atoms comprised in the backbone of different polymer chains are formed on the surface of the superabsorbent polymer particles.

In embodiments of the present invention, wherein surface cross-linking molecules having at least two C=C double bonds are added to the superabsorbent polymer particles prior to exposure to vacuum UV radiation, additional covalent bonds are formed between the polymer chains comprised at the surfaces of the superabsorbent polymer particles. These additional covalent bonds comprise the reaction product of said surface cross-linking molecules.

DETAILED DESCRIPTION OF THE INVENTION

The SAPs according to the present invention comprise cross-linked poly(meth)acrylic acid and salts thereof, i.e. the polymer has been polymerized from the $\alpha,\beta$-unsaturated carboxylic acid monomers, acrylic acid monomers and/or methacrylic acid monomers.

Preferably, SAPs comprise partially neutralized, slightly network crosslinked, polyacrylic acid (i.e. poly (sodium acrylate/acrylic acid)). Preferably, the SAPs are at least 50%, more preferably at least 70%, even more preferably at least 75% and even more preferably from 75% to 95% neutralized.

Network cross-linking renders the polymer substantially water-insoluble and, in part, determines the absorptive capacity of the hydrogel-forming absorbent polymers. Processes for network cross-linking these polymers and typical network cross-linking agents are described in greater detail in U.S. Pat. No. 4,076,663.

A suitable method for polymerizing the $\alpha,\beta$-unsaturated carboxylic acid monomers is aqueous solution polymerization, which is well known in the art. An aqueous solution comprising $\alpha,\beta$-unsaturated carboxylic acid monomers and polymerization initiator is subjected to a polymerization reaction. The aqueous solution may also comprise further monomers, which are co-polymerizable with the $\alpha,\beta$-unsaturated carboxylic acid monomers. At least the $\alpha,\beta$-unsaturated carboxylic acid has to be partially neutralized, either prior to polymerization of the monomers, during polymerization or post polymerization. In a preferred embodiment of the present invention, the monomers are at least 50 %, more preferably at least 70%, even more preferably at least 75% and even more preferably from 75% to 95% neutralized.

The monomers in aqueous solution are polymerized by standard free radical techniques, commonly by using a photo-initiator for activation, such as ultraviolet (UV) light. Alternatively, a redox initiator may be used. In this case, however, increased temperatures are necessary.

The water-absorbent resin will preferably be lightly cross-linked to render it water-insoluble. The desired cross-linked structure may be obtained by the co-polymerization of the selected water-soluble monomer and a cross-linking agent possessing at least two polymerizable double bonds in the molecular unit. The cross-linking agent is present in an amount effective to cross-link the water-soluble polymer. The preferred amount of cross-linking agent is determined by the desired degree of absorption capacity and the desired strength to retain the absorbed fluid, that is, the desired absorption under load. Typically, the cross-linking agent is used in amounts ranging from 0.0005 to 5 parts by weight per 100 parts by weight of monomers used. If an amount over 5 parts by weight of cross-linking agent per 100 parts is used, the resulting polymer has a too high cross-linking density and exhibits reduced absorption capacity and increased strength to retain the absorbed fluid. If the cross-linking agent is used in an amount less than 0.0005 parts by weight per 100 parts, the polymer has a too low cross-linking density and when contacted with the fluid to be absorbed becomes rather sticky, water-soluble and exhibits a low absorption performance, particularly under load. The cross-linking agent will typically be soluble in the aqueous solution.

Alternatively to, or in addition to, co-polymerizing the cross-linking agent with the monomers, it is also possible to cross-link the polymer chains in a separate process step after polymerization.

After polymerization, cross-linking and partial neutralization, the viscous SAPs are dehydrated (i.e. dried) to obtain dry SAPs. The dehydration step can be performed by heating the viscous SAPs to a temperature of about 120° C. for about 1 or 2 hours in a forced-air oven or by heating the viscous SAPs overnight at a temperature of about 60° C. The content of residual water in the SAP after drying predominantly depends on drying time and temperature. For use in the method of the present invention, dry SAP particles having a residual water content of below 5% by weight of dry SAP are preferred. Even more preferred is a residual water content of below 1% by weight of dry SAP and most preferred is a residual water content of below 0.5% by weight of dry SAP.

The SAPs can be transferred into particles of numerous shapes. The term "particles" refers to granules, fibers, flakes, spheres, powders, platelets and other shapes and forms known to persons skilled in the art of SAPs. E.g. the particles can be in the form of granules or beads, having a particle size of about 10 µm to 1000 µm, preferably about 100 µm to 1000 µm. In another embodiment, the SAPs can be in the shape of fibers, i.e. elongated, acicular SAP particles. In those embodiments, the SAP fibers have a minor dimension (i.e. diameter of the fiber) of less than about 1 mm, usually less than about 500 µm, and preferably less than 250 µm down to 50 µm. The length of the fibers is preferably about 3 mm to about 100 mm. The fibers can also be in the form of a long filament that can be woven.

SAP particles of the present invention comprise polymer chains, wherein at least a part of said polymer chains comprised on the surface of the SAP particles are cross-linked to each other through covalent bonds formed directly between the polymer chains. Further, the SAP particles of the present invention have improved hydrophilicity due to alcoholic hydroxyl-groups introduced in their polymer chains. The alcoholic hydroxyl groups are directly covalently bound via their oxygen to the carbon atoms of the polymer chain backbone. It should be noted that the present invention refers to alcoholic hydroxyl groups and not to hydroxyl groups comprised by carboxyl groups.

A "direct covalent bond" according to the present invention is a covalent bond wherein polymer chains are bound to each other only via a covalent bond with no intermediate atoms, such as atoms comprised by a cross-linking molecule. On the contrary, known cross-linking reactions between polymer chains always result in covalent bonds between these polymer chains, wherein the reaction product of the cross-linking molecule is built in between the polymer chains. Thus, known cross-linking reactions do not result in a direct covalent bond but in an indirect covalent bond comprising the reaction product of the cross-linking molecule. The direct covalent bond is formed between a carbon atom in the backbone of a first polymer chain and a carbon atom in the backbone of a second polymer chain. The bonds are formed intra-particulate within the SAP polymer, more specifically, they are formed on the surface of the SAP particles, while the core of the SAP particles is substantially free of such direct covalent bonds.

The direct covalent bonds between polymer chains according to the present invention are not intended to bond different SAP particles to each other. Thus, the method of the present invention does not lead to any appreciable inter-particulate direct covalent bonds between different SAP particles but only results in intra-particulate direct covalent bonds within an SAP particle. If present, such interparticulate direct covalent bonds would hence require additional inter-particulate cross-linking materials, such as cross-linking molecules.

The method of the present invention which directly bonds polymer chains to each other by a covalent bond between two carbon atoms can be applied for surface cross-linking SAP particles instead of or additional to conventional surface cross-linking.

The term "surface" describes the outer-facing boundaries of the particle. For porous SAP particles, exposed internal surfaces may also belong to the surface. The term "surface cross-linked SAP particle" refers to a SAP particle having its polymer chains present in the vicinity of the particle surface cross-linked to each other. It is known in the art to surface cross-link the polymer chains present in the vicinity of the particle surface by a compound referred to as surface cross-linker. The surface cross-linker is applied to the surface of the particle. In a surface cross-linked SAP particle the level of cross-links in the vicinity of the surface of the SAP particle is generally higher than the level of cross-links in the interior of the SAP particle.

Commonly applied surface cross-linkers are thermally activated surface cross-linkers. The term "thermally activated surface cross-linkers" refers to surface cross-linkers, which only react upon exposure to increased temperatures, typically around 150° C. Thermally activated surface cross-linkers known in the prior art are e.g. di- or polyfunctional molecules that are capable of building additional cross-links between the polymer chains segments comprised on the surface of the SAP particles. Thermally activated surface cross-linkers include, e.g., di- or polyhydric alcohols, or derivatives thereof, capable of forming di- or polyhydric alcohols. Representatives of such agents are alkylene carbonates, ketales, and di- or polyglycidlyethers. Moreover, (poly)glycidyl ethers, haloepoxy compounds, polyaldehydes, polyoles and polyamines are also well known thermally activated surface cross-linkers. The cross-linking is based on a reaction between the functional groups comprised by the polymer, for example, an esterification reaction between a carboxyl group (comprised by the polymer) and a hydroxyl group (comprised by the surface cross-linker). As typically a relatively big part of the carboxyl groups of the polymer chains is neutralized prior to the polymerization step, commonly only few carboxyl groups are available for this surface cross-linking process known in the art. E.g. in a 70% percent neutralized polymer only 3 out of 10 carboxylic groups are available for covalent surface cross-linking.

According to the method of the present invention, surface cross-linking molecules do not necessarily have to be added in order to obtain surface cross-linked SAP particles. On the contrary, according to the present invention, it is possible to surface cross-link the polymer chains comprised on the surface of the SAP particles by directly bonding the polymer chains to each other through a covalent bond.

However, preferably, surface cross-linking molecules may be added. In these embodiments a second type of cross-links can be formed which contains the reaction products of the cross-linking molecules. With the additional use of cross-linking molecules the efficiency of the reaction can be further enhanced due to shorter reaction times. Without wanting to be bound by theory, it is believed that the rate determining step of a VUV irradiation initiated cross-linking reaction in the absence surface cross-linking molecules is the so-called recombination of two carbon-centered radicals, forming a direct covalent bond between two carbon atoms comprised in two different polymer chains. This recombination follows a kinetic law of a second order reaction, i.e. the reaction rate of such combination reaction is proportional to the product of the concentrations of the two combining carbon-centered radicals.

If, however, surface cross-linking molecules are added, it is believed, that the reaction between the cross-linking molecule or its reaction product and the-carbon centered radical in the polymer chain, forming a covalent bond, follows a kinetic law of pseudo-first order, i.e. the reaction rate is only proportional to the concentration of the carbon-centered radical, since the concentration of the second reaction partner, i.e. the surface cross-linking molecule respectively its reaction product, is so high that it can be regarded as constant throughout the reaction. Reactions of pseudo-first order kinetics are known to be kinetically favored versus reactions of second order kinetics, i.e. they have a higher reaction speed, in particular if the reactive radicals, in this case the intermediate carbon-centered radicals in the polymer chains, are low in concentration. As a result thereof, the overall process can be run at a higher line speed due to the presence of the surface cross-linker and its kinetically favorable influence on the rate-determining step of the overall reaction. Due to the presence of surface cross-linking molecules, the method may be carried out with SAP particles having a very low residual water content of below 0.5% by weight of dry SAP. Moreover, the oxygen concentration present during VUV irradiation of the present invention may be kept to a minimum (even zero) if surface cross-linking molecules are additionally applied for the method of the present invention.

The optional surface cross-linking molecules, which may preferably be applied for the method of the present invention, comprise at least two C=C double bonds. More preferably, the surface cross-linking molecules comprise more than two C=C double bonds.

Preferred surface cross-linking molecules of the present invention are polyfunctional allyl and acryl compounds, such as triallyl cyanurate, triallyl isocyanurate, trimethylpropane tricrylate or other triacrylate esters, pentaerythritol triallyl ether, pentaerythritol tetraallyl ether, butanediol diacrylate, pentaerythritol tetraacrylate, tetra allylorthosilicate, di-pentaerythritol pentaacyralate, di-pentaerythritol hexaacyralate, ethyleneglycol diacrylate, ethyleneglycol dimethacrylate, tetra allyloxy ethane, diallyl phthalate, diethyleneglycol diacrylate, allylmethacrylate, triallylamine, 1,1,1-trimethylolpropane triacrylate, triallyl citrate, triallyl-s-triazin-2,4,6(1H,3H,5H)-trion or triallyl amine.

Alternatively, the surface cross-linking molecules are selected from the group consisting of squalene, N,N' methylenebisacrylamide, icosa-pentaenic acid, or sorbic acid.

The most preferred surface cross-linking molecule of the present invention is pentaerythritol tetraallyl ether.

For the method of the present invention, it is also possible to use two or more different surface cross-linking molecules.

Vacuum UV Irradiation

According to the present invention, the SAP particles are exposed to irradiation with vacuum UV radiation having a wavelength of from 100 nm to 200 nm (Vacuum UV) in order to induce the surface cross-linking reaction. More preferably, the wavelength is from 100 nm to 195 nm, and even more preferably, the wavelength is from 140 nm to 195 nm. Vacuum UV is a specific range of the Ultraviolet (UV) region of the electromagnetic spectrum. In the electromagnetic spectrum, UV light has a wavelength from 100 nm to 400 nm and is that portion that lies at energies beyond the "purple" edge of the visible spectrum. The UV spectrum is generally divided into the following ranges: UV-A (315-400 nm), UV-B (280-315 nm), UV-C (200-280 nm) and Vacuum UV (VUV) (100 to 200 nm).

Without wanting to be bound by theory, it is believed that the irradiation with Vacuum UV radiation induces the formation of carbon centred radicals comprised by the polymer chains. It is further believed that the reaction within the polymer chain takes place on an aliphatic group (C—H group) comprised by the polymer chain. When two such polymer chain radicals react with each other, a direct covalent bond between the polymer chains is formed.

In a second step, after the carbon-centred radicals have formed, those carbon-centered radicals can combine and form a direct covalent link between two carbon atoms comprised in the backbone of the polymer chains. In embodiments wherein surface cross-linking molecules have been added, the carbon-centred radicals can react with the surface cross-linking molecules, forming cross-links which connect at least different two polymer chains via the reaction product of the surface cross-linking molecule.

VUV irradiation enables the efficient formation of said carbon-centred radicals in high concentrations on the surface, without the need for additional initiator molecules, like e.g. radiation activatable radical formers. Such initiators may considerably add to the production cost of surface cross-linked SAP particles.

Another benefit of the use of VUV irradiation for triggering the formation of the intermediate carbon-centred radicals is its low penetration depth into the surface of SAP particles, which enables the formation of a thin shell at the surface of the SAP particles. Preferably, the surface cross-linking is restricted to the outer 0.1 μm to 3 cm of the SAP particles, more preferably to the outer 0.1 μm to 1 μm of the SAP particles.

Reaction Mechanism

Several mechanisms can be distinguished that contribute to the formation of the intermediate carbon-centred radicals. To some degree, those mechanisms may take place simultaneously.

Upon VUV irradiation, hydroxyl radicals are generated from water molecules via homolytic cleavage of O—H bonds. Those highly reactive, short-lived species are capable of abstracting hydrogen atoms from the carbon-hydrogen bonds (C—H bonds) of the polymer backbone, resulting in the formation of said carbon-centred radicals:

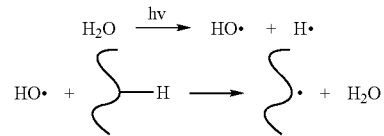

The water molecules can e.g. be the residual water molecules comprised within the dry SAP particles but it can also be added via a spray application or, preferably, as water vapor. For use in the method of the present invention, dry SAP particles having residual water content of below 5% by weight of dry SAP particles are preferred. Even more preferred is a residual water content of below 1% by weight of dry SAP particles and most preferred is a residual water content of below 0.5% by weight of dry SAP particles.

Alternatively, if SAP particles with very low residual water contents (below 0.5% by weight of the dry SAP particles) are used, the SAP particles may be slightly moisturized prior to exposing them to VUV irradiation in order to have more water molecules available for homolytic cleavage. To moisturize the SAP particles, it is e.g. possible to use the residual water remaining on the surface of the SAP particles from preceding production steps. Alternatively, it is possible to apply water moisture by spray application or by application as water vapor.

Homolytic cleavage of O—H bonds in water molecules can only be achieved to a substantial degree with UV irradiation having a wavelength of less than 200 nm.

Moreover, molecular oxygen can be homolytically cleaved, yielding highly reactive atomic oxygen, which reacts in an analogue way leading to the generation of carbon-centred radicals.

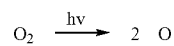

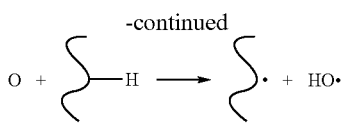

Residual oxygen adsorped onto the SAP particles can already contribute to the above reaction, in embodiments wherein the reaction is carried out under an inert gas atmosphere. Alternatively, it would be possible to add oxygen under controlled conditions (i.e. to control and adjust the partial pressure of oxygen present during the radical reaction).

Subsequently, two carbon-centered radicals generated in the backbone of the polymer chains comprised by the SAP particles combine to form a direct covalent bonds between the polymer chains.

Alternatively, a part of the carbon-centered radicals may undergo oxidation: Photochemically initiated oxidation can take place on the surface of the SAP particles, leading to the formation of new alcoholic hydroxyl groups in the polymer chain, it is e.g. believed that such hydroxyl groups may be formed upon reaction of a carbon-centered radical with an O—H radical:

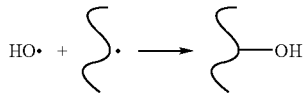

As another reaction resulting in the formation of hydroxyl groups, it is believed that in the presence of oxygen, peroxyl radicals are formed that can combine to form tetroxids which decompose in several steps, ultimately leading to alkoxy radicals, which readily abstract hydrogen to form a hydroxyl group in the polymer chain:

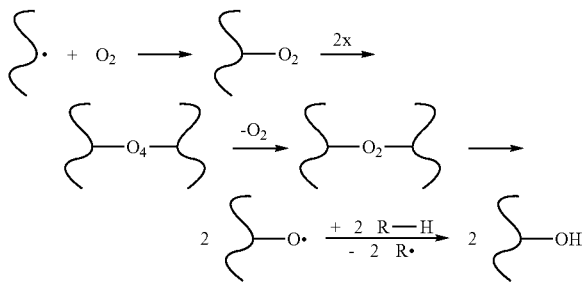

The above described alcoholic hydroxyl groups are directly covalently bound via their oxygen to the carbon atoms of the polymer chain backbone.

Due to these reactions involving water molecules and/or oxygen, alcoholic hydroxyl groups are introduced in the polymer chains. As the initial SAP particles applied to the process of the present invention consist of cross-linked poly(meth) acrylic acid and salts thereof, such alcoholic hydroxyl groups have not been present in the initial SAP particles. Hence, the method of the present invention results in the introduction of direct covalent bonds between the polymer chains comprised by the SAP particles and in the introduction of alcoholic hydroxyl groups in the polymer chains. As the reaction substantially takes place at the surface of the SAP particles (as the VUV irradiation does not penetrate into the core of the SAP particles to a substantial degree), the alcoholic hydroxyl groups are mainly formed at the surface of the SAP particles.

Therefore, the method of the present invention generates SAP particles with a high degree of homogenous surface cross-linking due to the direct covalent bonds and at the same time improves the hydrophilicity of the SAP particles because of the formation of alcoholic hydroxyl groups.

The extent to which each of the different reactions contributes to the formation of carbon-centred radicals can be influenced via choice of the reaction conditions, e.g. via the water content of the reaction mixture, the partial pressure of oxygen or by selecting/adjusting the most suitable VUV lamp (power of the lamp, distance from the SAP particles, exposure time).

VUV Lamps and Reactor

Several types of UV lamps can in principle be used to generate vacuum UV radiation, e.g. light of the 185 nm emission peak of conventional low pressure mercury lamps can be used to trigger the above reactions.

Preferably, xenon excimer radiation sources both pulsed or continuous, are applied. In contrast to well-known excimer lasers, excimer lamps are operated under different physical conditions and they emit incoherent electromagnetic radiation. In contrast to coherent radiation emitted by laser sources, incoherent or non-coherent radiation is characterized by elementary electromagnetic waves that do not have any phase relation in space and time. The production of incoherent excimer radiation in the vacuum-UV region of the electromagnetic spectrum is made possible for example by microwave discharges or by silent electrical discharges in gas atmospheres. The latter operation mode is also referred to as a dielectric-barrier discharge (DBD).

The preferred xenon excimer emission shows a relatively broad band in the VUV range having a wavelength of from 160 nm to 200 nm, peaking at a wavelength of 172 nm with a full width at half maximum (FWHM, half-width) of 14 nm.

While the fixed geometry (usually line, tube or coil forms) of most of the lamps available limits the freedom in reactor design, because the reactor geometry must be adapted to the lamp's appearance, this is not the case with the incoherent excimer VUV sources that are readily available with various geometries: cylindrical, planar or special shapes. Their design is independent of the configurations of the electrodes.

A most preferred reactor for the method of the present invention is a fluidized bed reactor in a radial symmetric geometry with a rod-shaped radiation source in the center. The reactor may be operated in a batch process; however, a continuous process is preferred. The gas (e.g. nitrogen), required to generate the fluidized bed, preferably enters the reactor from the bottom. In continuous processes, the SAP particles are carried with the gas and leave the reactor at the top end. In the batch operation mode a cyclone at the top of the reactor can be applied which keeps the SAP particles form leaving the reactor. The lamp can be optionally cooled with gas, and, to this end, it may be embedded in a cooling sleeve. The cooling sleeve may be made from Suprasil, a synthetic quartz glass permeable for VUV radiation. The outer walls of the reactor can e.g. be made from Pyrex glas.

In embodiments, where surface cross-linking molecules are additionally applied, those should be added e.g. by spray application in a solution with an inert solvent (that can be optionally evaporated) before the SAP particles enter the reactor. The surface cross-linking molecules can be applied in an organic solvent like dichloromethane which is evaporated directly after application. In embodiments, wherein the SAP particles are moisturized, it can also be applied together with the water (as a suspension or, if the cross-linking molecules are water soluble, as a solution). The surface cross-linking molecules are preferably applied in a concentration of from 0.1% to 10% by weight of dry SAP particles, more preferably in a concentration of from 1% to 5% by weight of dry SAP particles.

The water content should also be adjusted before the SAP particles enter the reactor.

A pulsed VUV radiation source suitable for lab studies is available under the trade name Xeradex™ from Osram, Munich, Germany, with a power of either 20 W or 100 W.

For industrial applications, continuous xenon excimer radiation sources with a power of up to 10 kW can be applied (available from the Company Heraeus, Atlanta, Ga., USA). Lamps with efficiencies of about 15 Einstein/kWh are available.

The SAP particles are preferably irradiated between 0.1 sec. and 30 min., more preferably between 0.1 sec. and 15 min, even more preferably between 0.1 sec. and 5 min and most preferably between 0.1 sec. and 2 min. The distance between the VUV-lamp(s) and the SAP particles which are to be cross-linked preferably varies between 2 mm and 150 mm, preferably between 2 mm and 50 mm and most preferably between 2 mm and 20 mm.

Prior art surface cross-linking has been restricted to carboxylic groups comprised by the polymer chains exposed on the surface of the SAP particle. Advantageously, the surface cross-linking process of the present invention is not restricted to the carboxyl groups but also comprises numerous other chemical groups (functional groups and aliphatic groups) within the polymer chains of the SAP. Hence, according to the present invention the number of available reaction sites for the surface cross-linking process of the SAP particles is strongly increased. Therefore, it is possible to achieve a far more homogenous, uniform surface cross-linking compared to the surface cross-linking known from the art. Furthermore, it is possible to surface cross-link the SAP to a higher degree than the SAP known from the prior art. This enables to make the SAP particles much stiffer, thus, to more effectively inhibit the gel-blocking effect at any given degree of neutralization.

Surface cross-linking of SAP particles substantially takes place only on the surface of the SAP particles. That means that polymer chains, which are exposed in the vicinity of the surface of the SAP particles, undergo a cross-linking process, leading to SAP particles with a high degree of cross-linking on their surface while the polymer chains comprised in the core of the SAP particles are not substantially affected. Hence, the covalent bonds formed directly between the polymer chains and, if surface cross-linking molecules are used in addition, the surface cross-links comprising the reaction products of surface cross-linking molecules are formed mainly on the surface of said superabsorbent particles whereas the core is substantially free of these cross-links.

Compared to the surface cross-linking known from the prior art, the surface cross-linking according to the present invention is much quicker. Prior art surface cross-linking reactions carried out under increased temperatures commonly take up to 45 minutes. This time consuming process step renders the manufacturing process of SAP particles less economic than desirable. In contrast, the cross-linking process according to the present invention can be carried out very quickly and hence, strongly adds to a much more efficient and economic overall manufacturing process.

Another advantage of the present invention refers to the neutralization step. $\alpha,\beta$-unsaturated carboxylic acid monomers are often neutralized prior to the polymerization step (pre-neutralization). Compounds, which are useful to neutralize the acid groups of the monomers, are typically those, which will sufficiently neutralize the acid groups without having a detrimental effect on the polymerization process. Such compounds include alkali metal hydroxides, alkali metal carbonates and bicarbonates. Preferably, the material used for neutralization of the monomers is sodium or potassium hydroxide or carbonate. The neutralizing compound is preferably added to an aqueous solution comprising the $\alpha,\beta$-unsaturated carboxylic acid monomers (pre-neutralization). As a result, the carboxyl groups comprised by the $\alpha,\beta$-unsaturated carboxylic acid monomers are at least partially neutralized. Consequently,—after the polymerization step—also the carboxyl groups comprised by the $\alpha,\beta$-unsaturated carboxylic acid of the polymer are at least partially neutralized. In case sodium hydroxide is used, neutralization results in sodium acrylate, which dissociates in water into negatively charged acrylate monomers and positively charged sodium ions.

If the final SAP particles are in the swollen state, after they absorb aqueous solution, the sodium ions are freely movable within the SAP particles. When used in absorbent articles, such as diapers or training pants, the SAP particles typically absorb urine. Compared to distilled water, urine comprises a relatively high amount of salt, which at least partly is present in dissociated form. The dissociated salts comprised by the urine make absorption of liquid into the SAP particles more difficult, as the liquid has to be absorbed against an osmotic pressure caused by the ions of the dissociated salts. The freely movable sodium ions within the SAP particles strongly facilitate the absorption of liquid into the particles, because they reduce the osmotic pressure. Therefore, a high degree of neutralization can largely increase the capacity of the SAP particles and the speed of liquid absorption. Furthermore, a higher degree of neutralization adds significantly to decreasing the production cost because, on a mass basis, less of the more expensive (meth)acrylic acid and more of the less expensive sodium hydroxide can be used as starting materials.

The surface cross-linkers known in the art react with the carboxyl groups of the polymer. Hence, the degree of neutralization has to be balanced with the need to surface cross-link, because both process steps make use of the carboxyl groups.

According to the method of the present invention, the surface cross-linking reaction induced by vacuum UV radiation does not require the presence of carboxyl groups. Therefore, it is possible to neutralize the monomers to a larger degree without significantly diminishing the possibility of later surface cross-linking.

A still further advantage of the present invention is the reduction of undesired side-reactions during the surface cross-linking process. Surface cross-linking known from the prior art requires increased temperatures, commonly around or above 150°. At these temperatures, not only the surface cross-linking reaction is achieved, but also a number of other reactions take place, e.g. anhydrate-formation within the polymer or dimer cleavage of dimers previously formed by the acrylic acid monomers. These side-reactions are highly undesired, because they result in SAP particles with decreases capacity.

As the surface cross-linking process according to the present invention does not necessarily need increased temperatures but can also be carried out at moderate temperatures using electromagnetic radiation, those side-reactions are substantially eliminated. According to the present invention, the surface cross-linking reaction induced by vacuum UV irradiation can preferably be accomplished at temperatures of less than 100° C., preferably at temperatures less than 80° C., more preferably at temperatures less than 50° C., even more preferably at temperatures less than 40° C., most preferably at temperatures between 20° C. and 40° C.

At elevated temperatures around or above 150° C. commonly applied in the surface cross-linking process known from the prior art, the SAP particles sometimes change their colour from white to yellowish. As according to the surface cross-linking process of the present invention, it is possible to carry out the surface cross-linking process under moderate temperatures, the problem of colour degradation of the SAP particles is strongly reduced.

Alternatively, the surface cross-linking according to the present invention can be carried out in addition to known surface cross-linking process, either prior to the known processes, simultaneously or afterwards. So, the surface cross-linking step induced by vacuum UV irradiation can be combined with one or more thermally activated surface cross-linking steps, e.g. using 1,4-butandiol. However, in this embodiment, the SAP particles have to comprise carboxyl groups wherein at least some of the carboxyl groups are at least partially exposed on the surface of the SAP particles and wherein the thermally activated surface cross-linker is covalently bound to at least a part of the carboxyl groups at least partially exposed on the surface of the SAP particles. Further, the temperature under which the method is carried out has to be adjusted to fit the requirements of the thermally activated surface cross-linking molecules.

Absorbent Articles

The SAP particles of the present invention are preferably applied in absorbent cores of absorbent articles. As used herein, absorbent article refers to devices that absorb and contain liquid, and more specifically, refers to devices that are placed against or in proximity to the body of the wearer to absorb and contain the various exudates discharged from the body. Absorbent articles include but are not limited to diapers, adult incontinent briefs, diaper holders and liners, sanitary napkins and the like.

Preferred absorbent articles of the present invention are diapers. As used herein, "diaper" refers to an absorbent article generally worn by infants and incontinent persons about the lower torso.

Absorbent articles especially suitable for the present invention typically comprise an outer covering including a liquid pervious topsheet, a liquid impervious backsheet and an absorbent core generally disposed between the topsheet and the backsheet. The absorbent core may comprise any absorbent material that is generally compressible, conformable, non-irritating to the wearer's skin, and capable of absorbing and retaining liquids such as urine and other certain body exudates. In addition to the SAP particles of the present invention, the absorbent core may comprise a wide variety of liquid-absorbent materials commonly used in disposable diapers and other absorbent articles such as comminuted wood pulp, which is generally referred to as air felt.

Exemplary absorbent structures for use as the absorbent assemblies are described in U.S. Pat. Nos. 5,137,537, 5,147,345, 5,342,338, 5,260,345, 5,387,207, 5,397,316, 5,625,222.

All documents cited in the Detailed Description of the Invention, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of surface cross-linking superabsorbent polymer particles which comprises the steps of
   a) providing superabsorbent polymer particles comprising polymer chain segments, the polymer chain segments comprising poly(meth)acrylic acid and salts thereof, each superabsorbent polymer particle having a surface and a core, and
   b) cross-linking the polymer chain segments by exposing said superabsorbent polymer particles to irradiation with vacuum UV radiation having a wavelength of from about 100 nm to about 200 nm.

2. The method of claim 1, wherein surface cross-linking molecules having at least two C=C double bonds are added to said superabsorbent polymer particles prior to exposure to vacuum UV radiation.

3. The method of claim 1, wherein said superabsorbent polymer particles provided for said method have a residual water content of less than about 5% by weight of said superabsorbent polymer particles.

4. The method of claim 1, wherein said superabsorbent polymer particles are moisturized with water prior to exposure to vacuum UV radiation.

5. The method of claim 1, wherein said vacuum UV radiation has a wavelength of from about 160 nm to about 200 nm with a radiation peak at a wavelength of about 172 nm.

6. The method of claim 1, wherein said method is carried out at temperatures of less than about 100° C.

7. The method of claim 1, wherein said superabsorbent polymer particles are exposed to vacuum UV radiation for from about 0.1 seconds to about 5 minutes.

8. An absorbent article comprising superabsorbent polymer particles made according to a method of claim 1, wherein the superabsorbent polymer particles are at least partially surface cross-linked via direct covalent links between two carbon atoms in the backbone of the polymer chains.

* * * * *